(Model.)

W. FAHY.
AXLE NUT.

No. 299,969. Patented June 10, 1884.

Witnesses:
A. S. Tucker.
J. K. Buck.

Inventor.
William Fahy

UNITED STATES PATENT OFFICE.

WILLIAM FAHY, OF BERLIN, WISCONSIN.

AXLE-NUT.

SPECIFICATION forming part of Letters Patent No. 299,969, dated June 10, 1884.

Application filed August 20, 1883. (Model.)

*To all whom it may concern:*

Be it known that I, WILLIAM FAHY, a citizen of the United States, residing in the city of Berlin, in the county of Green Lake and State of Wisconsin, have invented certain new and useful Improvements in Axle Nuts or Burrs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in axle nuts or burrs; and the object of my invention is to provide an axle nut or burr with a detachable washer or plate, which, when by use the axle-nut, the inner shoulders of the axle, and the boxes of the hub have become worn, allowing too much play or endwise movement of the wheel on the axle, accompanied by a rattling noise, may be affixed to the inner side or face of the nut, and thereby prevent the forward and backward movement of the wheel on the axle and the rattling noise incident thereto, reduce the wear of the bearings of the hub, the axle, and the nut to the minimum, and cause the wheels of such old or worn vehicle to travel truly on the track as the wheels on a new vehicle do.

Figure 1:
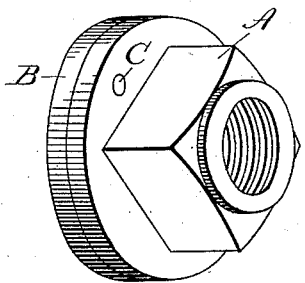
Figure 2:
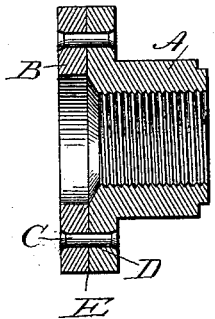

In the drawings, Figure 1 is a perspective view of an axle-nut with my improvement affixed, and Fig. 2 is a sectional view of an axle-nut with my improvement riveted thereto.

Like letters refer to similar parts in both views.

A represents the axle-nut; B, the washer or plate; C C, the bolts, rivets, or screws; D D, suitable corresponding holes through the nut and the plate for said rivets, bolts, or screws, and E the face of the nut to which the plate is affixed.

I am aware that independent washers have heretofore been interposed between the axle-nut and the boxes of the hub, which washers, being free on the axle, could revolve with the wheel, and would rub and wear against the nut as well as against the box of the hub; and I am aware that an axle-nut of a special and peculiar pattern, having "two, three, or four projections or thickened parts," "through which are tapped two, three, or four set-screws" adapted to "bear against the (adjustable) washer," the ends of which screws have been, when desired, reduced, to "fit them in holes in the washer," has been used as claimed in Letters Patent No. 212,842, issued March 4, 1879, to G. J. Dykes, which device I do not claim as my invention; but my invention consists in affixing rigidly to the inner face of common axle-nuts a plate or washer of the required thickness by rivets, bolts, or screws through suitable and corresponding holes in such nut and plate, whereby the movement of the wheel back and forth endwise on the axle is avoided, the rattle of the wheel on the axle stopped, and the wheels are made to keep the track like those of a new vehicle, and said plate, being affixed to the nut, will not, when the nut and wheel are removed for oiling, fall into the dirt or get lost, as independent washers are liable to do, and being so affixed rigidly to the face of the nut protects it from all wear, and keeps the friction and wear against and upon itself and the boxes of the hub at the minimum, as but one surface on it is exposed to attrition.

Having thus described my invention, what I claim as new, and desire to secure by Letters Patent, is—

1. A washer or plate rigidly affixed to the face of axle-nuts, substantially as and for the purpose specified.

2. The combination, with the axle-nut A, of the washer or plate B and the rivets or bolts C C, with suitable corresponding holes, D D, for such rivets or bolts, through the nut and plate, substantially as and for the purpose specified.

WILLIAM FAHY.

Witnesses:
 W. E. ROSE,
 A. L. TUCKER.